(12) United States Patent
Stewart et al.

(10) Patent No.: US 7,437,291 B1
(45) Date of Patent: Oct. 14, 2008

(54) USING PARTIAL INFORMATION TO IMPROVE DIALOG IN AUTOMATIC SPEECH RECOGNITION SYSTEMS

(75) Inventors: Osamuyimen T. Stewart, Piscataway, NJ (US); David M. Lubensky, Brookfield, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/956,251

(22) Filed: Dec. 13, 2007

(51) Int. Cl.
*G10L 15/00* (2006.01)
(52) U.S. Cl. .............................. 704/251; 10/257; 10/270
(58) Field of Classification Search .................... 704/10, 704/251, 257, 270
See application file for complete search history.

(56) References Cited

U.S. PATENT DOCUMENTS

| | | |
|---|---|---|
| 5,233,681 A | 8/1993 | Bahl et al. |
| 5,293,584 A | 3/1994 | Brown et al. |
| 5,623,609 A | 4/1997 | Kaye et al. |
| 5,625,748 A | 4/1997 | McDonough et al. |
| 5,737,489 A | 4/1998 | Chou et al. |
| 5,805,772 A | 9/1998 | Chou et al. |
| 5,999,902 A | 12/1999 | Scahill et al. |
| 6,157,913 A | 12/2000 | Bernstein |
| 6,535,849 B1 | 3/2003 | Pakhomov et al. |
| 6,539,353 B1 | 3/2003 | Jiang et al. |
| 6,751,595 B2 | 6/2004 | Busayapongchai et al. |
| 6,920,420 B2 | 7/2005 | Lin |
| 7,016,845 B2 | 3/2006 | Vora et al. |

(Continued)

FOREIGN PATENT DOCUMENTS

WO    WO 96/41333    12/1996

(Continued)

OTHER PUBLICATIONS

Business Wire, "Nuance's Focus Infomatics Subsidiary Sees Dramatic Growth for Outsourced Transcription Services Powered by Speech Recognition," Business Wire, Oct. 9, 2007.

(Continued)

*Primary Examiner*—Daniel D Abebe
(74) *Attorney, Agent, or Firm*—Scully, Scott, Murphy & Presser, P.C.; Anne V. Dougherty, Esq.

(57) ABSTRACT

A method, system and computer readable device for recognizing a partial utterance in an automatic speech recognition (ASR) system where said method comprising the steps of, receiving, by a ASR recognition unit, an input signal representing a speech utterance or word and transcribing the input signal into text, interpreting, by a ASR interpreter unit, whether the text is either a positive or a negative match to a list of automated options by matching the text with a grammar or semantic database representing the list of automated options, wherein if the ASR interpreter unit results in said positive match proceeding to a next input signal and if the ASR interpreter unit results in said negative match rejecting the text as representing said partial utterance, and processing, by a linguistic filtering unit, the rejected text to derive a correct match between the rejected text and the grammar or semantic database. And, then using the derived word for responding to the user in the next dialog turn in order to reduce or eliminate churn in the human-computer spoken dialog interaction.

1 Claim, 2 Drawing Sheets

U.S. PATENT DOCUMENTS

| | | | |
|---|---|---|---|
| 7,043,429 | B2 | 5/2006 | Chang et al. |
| 7,085,717 | B2 | 8/2006 | Kepuska et al. |
| 7,092,883 | B1 | 8/2006 | Gretter et al. |
| 7,162,422 | B1 | 1/2007 | Bennett et al. |
| 2002/0042711 | A1 | 4/2002 | Lin |
| 2002/0128836 | A1 | 9/2002 | Konuma et al. |
| 2003/0009335 | A1 | 1/2003 | Schalkwyk et al. |
| 2004/0117189 | A1* | 6/2004 | Bennett ............... 704/270.1 |
| 2004/0249637 | A1* | 12/2004 | Baker .................... 704/239 |
| 2005/0086049 | A1* | 4/2005 | Bennett ...................... 704/4 |
| 2005/0086059 | A1 | 4/2005 | Bennet |
| 2005/0159950 | A1* | 7/2005 | Roth et al. ............... 704/236 |
| 2006/0085184 | A1 | 4/2006 | Marcus |
| 2006/0190258 | A1 | 8/2006 | Verhasselt et al. |
| 2006/0235696 | A1* | 10/2006 | Bennett ............... 704/270.1 |
| 2006/0293886 | A1 | 12/2006 | Odell et al. |
| 2007/0038436 | A1 | 2/2007 | Cristo et al. |
| 2007/0050190 | A1 | 3/2007 | Washio et al. |
| 2007/0124147 | A1 | 5/2007 | Gopinath et al. |
| 2007/0198269 | A1 | 8/2007 | Braho et al. |

FOREIGN PATENT DOCUMENTS

| | | |
|---|---|---|
| WO | WO00/73936 | 12/2000 |
| WO | WO07/021587 | 2/2007 |

OTHER PUBLICATIONS

Godfrey, J. J., et al., "Switchboard: Telephone Speech Corpus for Research and Development," Acoustics, Speech, and Signal Processing, 1992. ICASSP-92, 1992 IEEE International Conference, Publication Date: Mar. 23-26, 1992, vol. 1, pp. 517-520 vol. 1.

Moore, R. K, et al., "A Comparison of Phoneme Decision Three (PDT) and Context Adaptive Phone (CAP) Based Approaches to Vacabulary-independent Speech Recognition," Acoustics, Speech, and Signal Processing, 1994, ICASSP-94., 1994 IEEE International Conference, Publication Date: Apr. 19-22, 1994, vol. I, pp. I/541-I/544 vol. 1.

PR Newswire, "Parus Interactive Awarded Patent for Natural Intuitive Speech Recognition to Manage Communications," PR Newswire, Jul. 25, 2007.

Riittinen, H., et al., "Experiments on an isolated-word recognition system for multiple speakers," Acoustics, Speech, and Signal Processing, IEEE International Conference on ICASSP '81, Publication Date: Apr. 1981, vol. 6, pp. 975-978.

Sharp, R., et al., "The Watson Speech Recognition Engine," 1997 IEEE International Conference on Acoustics, Speech, and Signal Processing (ICASSP'97), vol. 5, p. 4065.

Wessel, F., et al., "Unsupervised Training of Acoustic Models for Large Vocabulary Continuous Speech Recognition," Speech and Audio Processing, IEEE Transactions, Publication Date: Jan. 2005, vol. 13, Issue: 1, pp. 23-31.

* cited by examiner

US 7,437,291 B1

USING PARTIAL INFORMATION TO IMPROVE DIALOG IN AUTOMATIC SPEECH RECOGNITION SYSTEMS

FIELD OF THE INVENTION

The present invention generally relates to automatic speech recognition (ASR), more particularly, to a method, system and computer program storage device for using partial utterances or words to improve dialog in an ASR system.

BACKGROUND OF THE INVENTION

Increasingly, businesses, industries and commercial enterprises, among others employ automated telephone call systems with interactive voice response (IVR) offering self-service menus. Instances of contacting an actual human responder are becoming rare. These automated telephone call systems utilize technologies such as automatic speech recognition (ASR), which allows a computer to identify the speech utterances or words that a caller speaks into their telephone's microphone and match it with the voice drive menu. Such automated telephone call centers employing existing ASR technologies are prone to errors in identification and translation of a caller's speech utterances and words. With the increased use of cordless and cellular telephones, the instances of errors are compounded due to the inherent noise and/or static found in such wireless systems. Hence, a large percentages of callers' speech utterances or words are distorted such that only partial units of information gets processed by the automated telephone call systems resulting in re-prompting callers for menu selection choices that user previously stated, or erroneous responses by the system, or no response at all.

A conventional method of automatic speech recognition (ASR) 100 is illustrated in FIG. 1, which requires that a caller first utter a speech utterance or word 110, which is then transcribed into text by ASR transcription 120 (speech-to-text conversion). The output of the ASR transcription (or test string) 120 is passed to the ASR interpreter/grammar module 130 for semantic interpretation or understanding. Typically, this form of ASR semantic interpretation usually involves a simple of process of matching the recognized form (e.g. text string) of the caller's speech utterance or word with the pre-defined forms that exist in the grammar. Typically, each matched item is assigned a confidence score by the system and so when there is a positive match 140 with a high confidence score then the output is used by the dialog manager (not shown) to execute the next relevant action, (e.g., transition to a new dialog state or to satisfy the user's request) 160.

By contrast, when the recognized text string does not match the pre-defined existing forms in the grammar, this results in an instance of a negative match or a "No Match," 150. Consequently, the conventional ASR system 100 will have to increase the error count and give the user additional tries by returning to the previous dialog state to ask for the same information all over again 170. The number of retries is a variable that can be set by a voice user interface call flow variable where the usual practice is to cap the number of retries to a maximum of three, after which the system gives up and caller is transferred to an agent. This is the source of the problem in the current implementation, e.g., the blanket rejection of utterances that do not match (100%) with the existing pre-defined forms in the grammar. For example, if a caller utters, "I want to speak to the director of Human Language Technology" what may be recognized by the conventional ASR system 100 is only partial information such as "-anguage-logy". Based on the conventional matching process, the text strings "language" and "technology" which are pre-defined in the grammar will not match the partial forms "-anguage" and "-logy", resulting in such partial information being treated as a No Match because it is rejected by the ASR interpreter/grammar module 130. As a result the caller is asked to try again by the conventional ASR system 100 and so on and so forth until a successful match (translation) is achieved within the limited number of tries else the caller is transferred to the agent.

In some instances, the developer may formulate post-processing rules which will map, for example, partial strings like "-anguage" to full forms like "language". The problem is that this is not an automatic process, and very often occurs later in the development process (during the tuning of the application after some interval from the initial deployment), and also only some items (high frequency errors) are targeted for such post-processing rules. In other words, post processing rules are selective (applies to isolated items), manual (not automatic), and costly to implement since it involves human labor. Accordingly, the problem in conventional ASR systems described above, is that current speech systems simply fail to make any fine-grained distinction within the No Match classification. In other words, in instances where a caller's utterance or word does not match completely with what is listed in the ASR interpreter/grammar module 130, it is rejected as No Match as lacking any intelligence that can be used to respond to a caller and thus move the dialog with automated telephone call systems along to the next sequence. Upon reaching the maximum number of retries (and if the error persists) the call ends up being transferred to an agent. For the success of self-service automation and to increase wider user adoption of speech systems, it is extremely important to solve this problem, particularly as the majority of users' calls are made from a cordless or cellular phone which, as explained above, have poor quality of reception thereby increasing the likelihood of a users' utterances or words to be partially recognized.

Having set forth the limitations of the prior art, it is clear that what is required is a method, system or computer program storage device capable of fine-grained distinction within the No Match classification of an ASR system to improve the success rate of self service automation in an automated telephone call systems with interactive voice response self-service menus.

SUMMARY OF THE INVENTION

It is therefore an object of the present invention to provide a method, system and computer program storage device for using partial utterances to improve dialog in an ASR system.

An additional object of the present invention is to provide a method, system and computer program storage device for recognizing (i.e., deriving meaningful linguistic information from) a partial utterance in an automatic speech recognition (ASR) system where the method comprising the steps of: receiving, by an ASR recognition unit, an input signal representing a speech utterance or word and transcribing the input signal into electronic form or a form adopted for comparison, interpreting, by a ASR interpreter unit, whether the text is either a positive or a negative match to a list of automated options by matching the text with a grammar or semantic database representing the list of automated options, wherein if the ASR interpreter unit results in the positive match, proceeding to a next input signal, and if the ASR interpreter unit results in the negative match, rejecting and submitting the text for evaluation as representing the partial utterance, and processing, by a linguistic filtering unit, the rejected text to derive a correct match between the rejected text and the grammar or semantic database.

An additional object of the present invention is to further provide that the step of processing, by the linguistic filtering unit, further comprises the steps of: determining if the rejected text is a "parsable" speech utterance or word by means of a phonological, morphological, syntactic and/or semantic process (es), wherein each process (es) results in a suggested form of speech utterance or word for each of the process(es), assigning a score of +1 for each suggested form of speech utterance or word and ordering the suggested form of speech utterance or word by a cumulative total score, and hypothesizing possible forms of the ordered rejected text by comparing each of the suggested form of speech utterance with existing words in the grammar or semantic database by a context-relevant matching process.

Another additional object of the present invention is to provide the steps in the voice user interface call flow, of confirming, by a user, whether the hypothesized possible forms of the ordered text is the "intended" speech utterance or word.

BRIEF DESCRIPTION OF THE DRAWINGS

The objects, features and advantages of the present invention will become apparent to one skilled in the art, in view of the following detailed description taken in combination with the attached drawings, in which.

DETAILED DESCRIPTION OF THE PREFERRED EMBODIMENTS

Hereinafter, embodiments of the present invention will be described in detail with reference to the accompanying drawings. For the purposes of clarity and simplicity, a detailed description of known functions and configurations incorporated herein will be omitted as it may make the subject matter of the present invention unclear.

Figure 1:
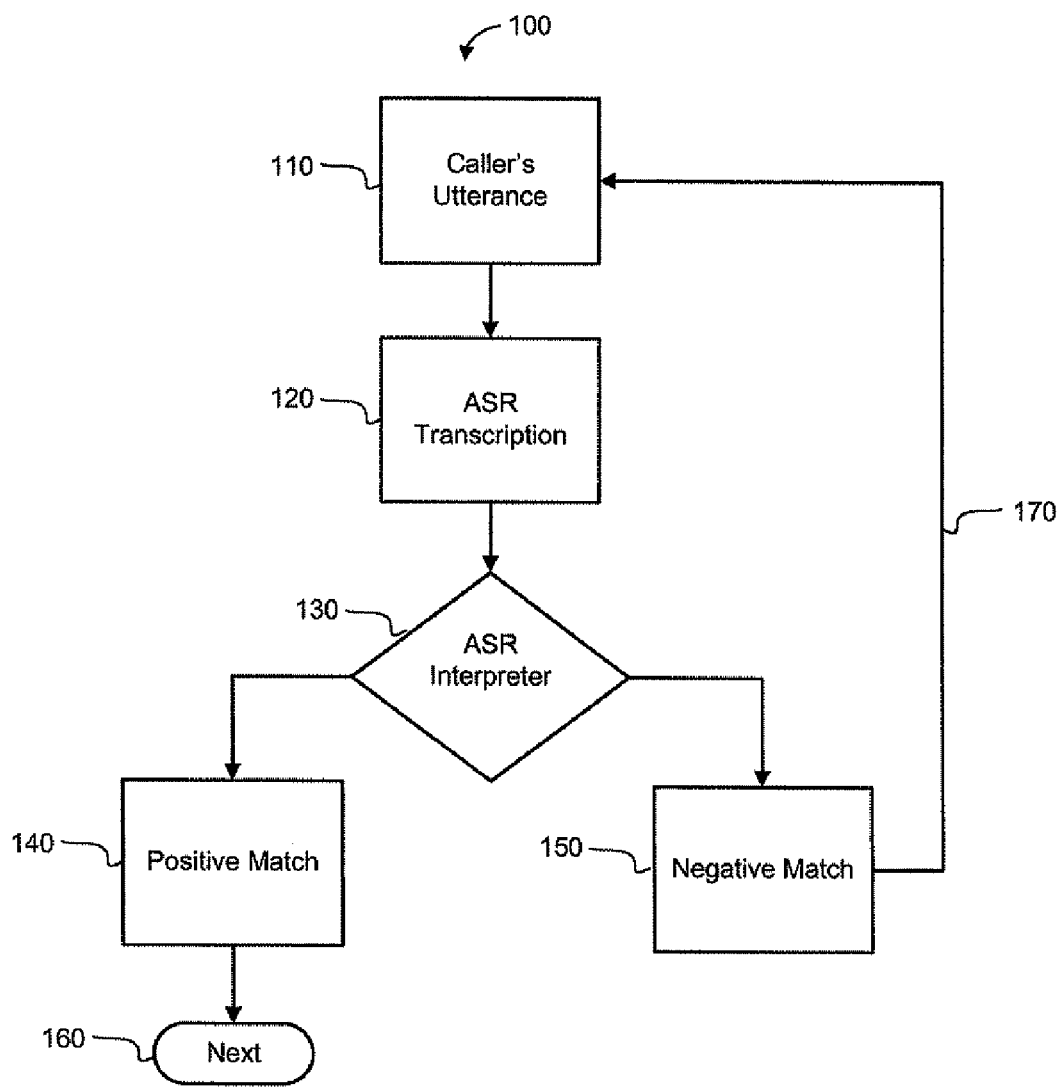
FIG. 1 is an illustration of a conventional automatic speech recognition system according to the prior art.
Figure 2:
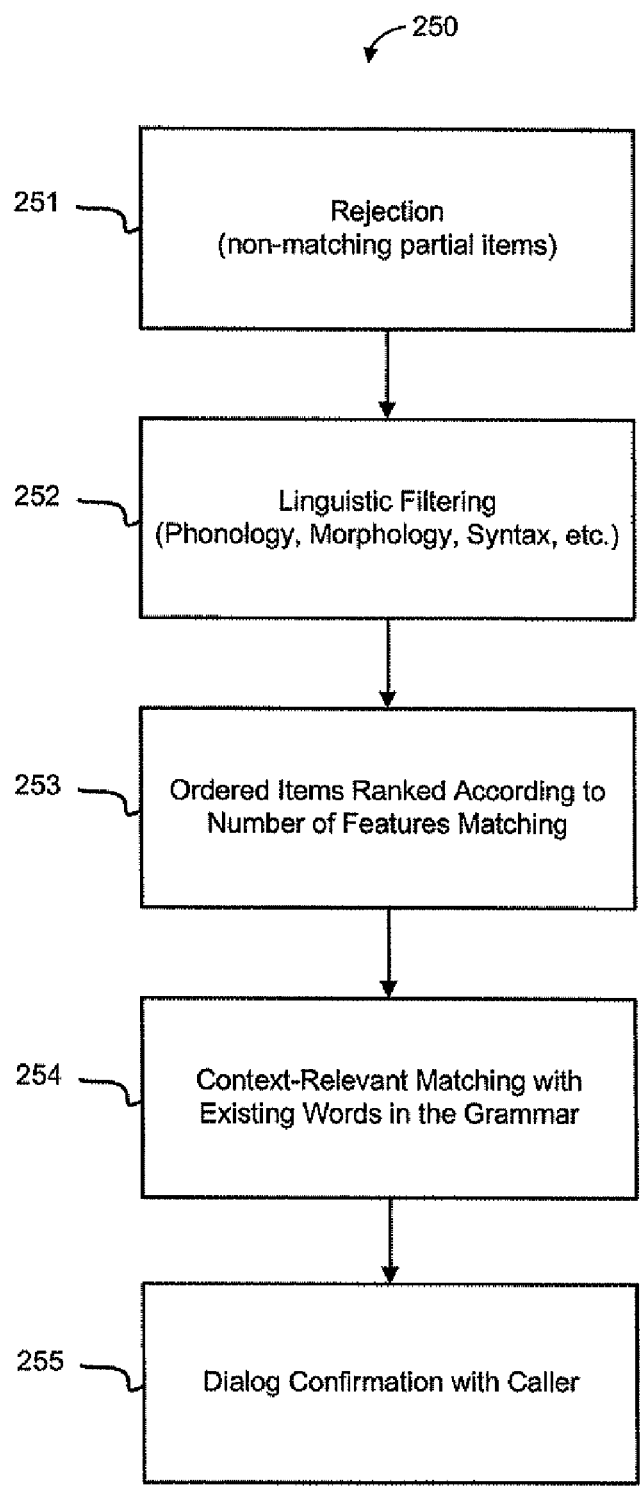
FIG. 2 is an illustration of a method, system and computer readable storage device for automatic speech recognition system capable of using partial utterances to appropriately respond to a user in an automatic speech recognition system in accordance with one possible embodiment of the present invention.

FIG. 2 is an illustration of a method, system and computer readable storage device for automatic speech recognition (ASR) system capable of using partial utterances that have been rejected as not matching pre-defined forms in the grammar 250 in accordance with one embodiment of the present invention. In operation, the present invention provides a method of handling the negative match 150 output from the ASR interpreter 130 as shown in FIG. 1. In other words, the ASR interpreter 130 concluded that a caller's utterance 110 or word is a No Match 150 and the present invention provides an additional process of determining what the caller has uttered rather than continuing to loop 170 through several iterations of asking the caller to repeat the utterance or word.

As can be seen in FIG. 2, a caller's utterance is rejected 251 as non-matching and also determined to be containing partial items, i.e., word fragments or clipped phrases. The non-matching partial items are passed to a linguistic filter process 252 that includes morphological, syntactic, semantic, and phonological processes for recovering the full form of the callers' utterance or word. In this regard, the partial item is evaluated based on the application of each linguistic feature. As an illustration, consider a simple grammar with two pre-defined words: (a) unsuspecting, and (b) unrealistic. Now, a caller speaks their utterance but only the partial form "un---ting" is recognized. This partial information is passed on the Linguistic Filter for evaluation based on the application of the following components:

Morphological: evaluates the shape of the partial form if it is consistent with predictable or acceptable morphological forms Phonological: evaluates the shape of the partial form if it consistent with predictable or acceptable phonological forms such as syllable structure information (e.g., it examines questions like, can such a string or syllable occur in word initial position, or word final position, etc)

Semantic: evaluates if the morpho-phonological form has any correlating meaning

Syntactic: evaluates if the morpho-phonological and semantic form has any correlating syntactic class or property including lexical category information (whether Noun or Verb, or adjective, etc.)

For each linguistic process that applies from all four categories, the partial form is assigned a +1 score.

As an illustration, the linguistic filter based on the each of the components described above will apply for the string "un" in the following manner:

Phonological="un" (score+1)

Morphological="un" (score+1)

Semantic="un" (score+1)

Syntactic="un" (score 1)

This means that the partial string "un" contains phonological (+1), morphological (+1), semantic (+1) and syntactic (+1) information that can be applied for determining the actual word by comparing with the existing words in the grammar. The cumulative weight from the linguistic filter for the partial string is a score of 4 based on a positive score from each of the four linguistic components.

As an additional illustration, the linguistic filter based on the each of the components will apply for the string "ting" in the following manner:

Phonological="ting" (score+1)

Morphological="ting" (score+1)

Semantic="ting" (score+0)

Syntactic="ting" (score 0)

This means that the partial string "ting" contains only phonological (+1) and morphological (+1), information that can be applied for determining the actual word by comparing with the existing words in the grammar. In this instance, the partial string lacks semantic (0) and syntactic (0) features. Consequently, the cumulative weight from the linguistic filter for the partial string "ting" is a score of 2 based on a positive score from only two of the four linguistic components.

The linguistic filtering process 252 is followed by an ordering and ranking process 253, which sums the partial forms (cumulative scores) resulting from the number of processes matched by the morphological, syntactic, semantic, and phonological properties in the linguistic filter and posit these as possible forms for the partially recognized form. Continuing with the example from the previous paragraph, when the ordering and ranking process is applied, the following results are derived:

Partial form that was recognized="un-----ting"

Predefined items in the grammar: "unsuspecting" "unrealistic"

Applying the ordering and ranking process will yield:

[Un]=(4 linguistic properties)

[ting]=(2 linguistic properties)

These processes are ordered in terms of the cumulative scores or values from the linguistic filtering process 252 to determine if a partial form indeed has enough linguistic evidence for deriving their linguistic status 253 and then used for making a direct comparison with the existing pre-defined words in the grammar 254. As we see from this illustration, both strings in the partially recognized utterance contain sufficient linguistic information ("un" has 4 and "ting" has 2) that can be used for the evaluation of existing words in the grammar to find the right match in order to make progress in the dialog. Crucially, a string only requires a minimum of 1 positive score to be used for this sort of evaluation.

Next, the ranked 'reconstructed' form is compared with existing words in the grammar database to find the context-relevant matches 254. Context-relevance is calculated on the basis of the existing forms in the pre-defined grammar. This means that the partial forms are compared only to the existing forms in the grammar and nothing else. Thus, based on the combination of the score from the linguistic filtering process 252 along with the context-relevant matching, the most confident form is posited for confirmation to the caller 255. As an illustration, when the partial form is compared with the two pre-defined words in the grammar the following results emerge:

"un" and "ting" are partial strings that can be identified with the word "unsuspecting" through the matching process. Furthermore, based on the linguistic filter results, Un-suspec-ting matches the partial form in a total of 6 linguistic features (as shown in 0016).

By comparison, only one part of the partial strings "un" and "ting" can be identified in the other word in the grammar "urealistic". More importantly, Un-realis-tic matches the partial form in only 4 linguistic features (as shown in 0016).

Consequently, the caller is offered the highest ranked result in the output (unrealistic) and the caller is asked to confirm or reject the "reconstructed" word in the ensuing dialog.

Thus, for example, when a caller says "I want to see if there is a problem with the --otes" where the first syllable of "notes" is clipped off. Or in the example provided above where only "-anguage-logy" is recognized, instead of classifying these into the No Match bucket the "partial string" is sent to the ASK interpreter and used in comparing the list of related forms in the grammar. The grammar (interpreter) already includes the full form of the relevant phrases that a caller might say. Accordingly, by comparing with existing forms in the grammar, the system will produce a list of related forms and then rank these with relative confidence of 'closeness' computed from context-relevance (e.g., how much they match existing forms using a linguistic filter). Then, the user is given a chance to confirm or refine the partially recognized form. Based on this process, instead of rejecting a partial utterance, the system will come back with its best guess about the callers' intended word using a matching algorithm in the linguistic filter to reconstruct the utterance's meaning, form, or structure and then offer the caller a more intuitive way to confirm or refine what was recognized without necessarily losing a dialog turn. In this regard, the voice user interface (VUI) call flow may provide a re-prompt, such as, "I am sorry I didn't catch all of that, did you say you want help with "notes"? The "reconstructed" word from the partially recognized utterance is offered in the dialog response by the computer system instead of the conventional re-prompt that says "I'm sorry, I did not catch that. Please say that again" which typically results in multiple re-tries and subsequently with the caller being transferred to a human Agent.

Moreover, the present invention contrasts existing approaches, which use (a) confidence score and, or (b) n-best list to determine the confidence or legitimacy of items in speech recognition grammars. By definition and process, these approaches consistently fail to apply to partially recognized forms because they operate on fully well-formed words or utterances. Instead, the present invention provides a new approach to determining the confidence or legitimacy of partially recognized words or utterances whereby each linguistic feature in the Linguistic Filter is automatically applied in trying to recover or match the partial form and then using the output from the filter for comparing the "reconstructed" words from the partial items with the existing full forms already in the grammar. As previously explained, each linguistic feature that applies to a partial string gets assigned a score of +1. The cumulative weight derived from adding up all the positive counts from the linguistic features is then used for determining the legitimacy of the word. The matching word with the highest number of positive features is postulated as the actual word that the user had originally spoken (which was partially recognized) and this "reconstructed" word is offered in the subsequent dialog with the user.

As will be readily apparent to those skilled in the art, the present invention or aspects of the invention can be realized in hardware, or as some combination of hardware and software. Any kind of computer/server system(s)—or other apparatus adapted for carrying out the methods described herein—is suited. A typical combination of hardware and software could be a general-purpose computer system with a computer program that, when loaded and executed, carries out methods described herein. Alternatively, a specific use computer, containing specialized hardware for carrying out one or more of the functional tasks of the invention, could be utilized.

The present invention or aspects of the invention can also be embodied in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The present invention can also be embodied as a program on a computer-readable recording medium. Examples of the computer-readable recording medium include but are not limited to Compact Disc Read-Only Memory (CD-ROM), Random-Access Memory (RAM), floppy disks, hard disks, and magneto-optical disks.

While there has been shown and described what is considered to be preferred embodiments of the invention, it will, of course, be understood that various modifications and changes in form or detail could readily be made without departing from the spirit of the invention. It is therefore intended that the scope of the invention not be limited to the exact forms described and illustrated, but should be construed to cover all modifications that may fall within the scope of the appended claims.

We claim:

1. A method of correctly determining content or meaning from a partial spoken utterance in an automatic speech recognition (ASR) system, said method comprising the steps of:

receiving, by a ASR recognition unit, an input signal representing a speech utterance or word and transcribing said input signal into a representative electronic textual form;

interpreting, by a ASR interpreter unit, whether said representative electronic textual form is either a positive or a negative match to a list of automated options by matching said representative electronic textual form with a grammar or semantic database representing said list of automated options, wherein if said ASR interpreter unit results in said positive match proceeding to a next input signal and if said ASR interpreter unit results in said negative match rejecting and submitting said representative electronic textual form as representing said partial utterance;

processing, by a linguistic filtering unit, said rejected representative electronic textual form to derive a correct match between said rejected representative electronic textual form and said grammar or semantic database; and determining by said linguistic filtering unit, if said rejected representative electronic textual form is said speech utterance or word by a phonological, morphological, syntactic and/or semantic process(es), wherein each process(es) results in a suggested form of speech utterance or word for each of the process(es);

assigning a score for each suggested form of speech utterance or word and ordering said suggested form of speech utterance or word according to a cumulative total score; and comparing each said suggested form of speech utterance with existing words in said grammar or semantic database by a context-relevant matching process; and hypothesizing possible forms of said ordered rejected text based on said comparing.

* * * * *